United States Patent [19]
Leavitt et al.

[11] Patent Number: 4,468,747
[45] Date of Patent: Aug. 28, 1984

[54] SCAN CONVERTER SYSTEM

[75] Inventors: Steven C. Leavitt, Hampstead, N.H.; Hugh G. Larsen, West Newbury, Mass.; Barry F. Hunt, Nashua, N.H.

[73] Assignee: Hewlett-Packard Company, Palo Alto, Calif.

[21] Appl. No.: 340,663

[22] Filed: Jan. 19, 1982

Related U.S. Application Data

[63] Continuation-in-part of Ser. No. 203,746, Nov. 3, 1980, abandoned.

[51] Int. Cl.³ .......................... G06F 15/20; H04N 5/02
[52] U.S. Cl. ..................... 364/577; 364/514; 358/140; 358/112; 73/620
[58] Field of Search ............... 364/414, 415, 417, 169, 364/515, 516, 518, 577; 358/112, 140, 166; 128/660; 73/606, 618, 624, 620

[56] References Cited

U.S. PATENT DOCUMENTS

| | | | |
|---|---|---|---|
| 4,002,827 | 1/1977 | Nevin et al. | 358/140 X |
| 4,058,001 | 11/1977 | Waxman | 73/620 |
| 4,074,281 | 2/1978 | Quarton | 364/723 X |
| 4,101,961 | 7/1978 | Fletcher et al. | 364/417 |
| 4,115,806 | 9/1978 | Morton | 364/515 X |
| 4,127,034 | 11/1978 | Lederman et al. | 364/415 X |
| 4,140,022 | 2/1979 | Maslak | 364/415 X |
| 4,155,259 | 5/1979 | Engeler | 364/415 X |
| 4,164,213 | 8/1979 | Hoelzler | 364/415 X |
| 4,187,857 | 2/1980 | Sato | 364/417 X |
| 4,206,653 | 6/1980 | LeMay | 364/415 X |
| 4,212,072 | 7/1980 | Huelsman | 358/112 X |
| 4,225,931 | 9/1980 | Schwefel | 364/557 |
| 4,231,097 | 10/1980 | Shibayama et al. | 364/557 |

FOREIGN PATENT DOCUMENTS 1208310 10/1970 United Kingdom .
1413045 11/1975 United Kingdom .
1444819 8/1976 United Kingdom .

*Primary Examiner*—Edward J. Wise
*Attorney, Agent, or Firm*—Donald N. Timbie

[57] ABSTRACT

Apparatus for displaying the information represented by data samples occurring along radial lines at display points arranged in rows and columns wherein intermediate interpolated data values are derived at the intersections of a row containing a display point for which a final data value is sought with radii on either side of the display point and interpolating the first and second intermediate interpolated data values so as to derive a final interpolated data value at the angular position of the display point with respect to the radii.

3 Claims, 18 Drawing Figures

FIG. 2A
| | BIT # | L # | DATA | |
|---|---|---|---|---|
| L# OR DATA | 0 (MSB) | 1 | 0 | 1 = L# ; 0 = DATA HDR |
| SIGN | 1 | | | 1 = LEFT QUAD, 0 = RIGHT QUAD |
| | 2 | ↑ | ↑ | |
| | 3 | | | |
| | 4 | | | |
| | 5 | | | |
| | 6 | | ↓ | |
| | 7 | | | |
| | 8 | ↓ | | |
| | 9 | | | |
| | 10 | | | |
| STROBE | 11 (LSB) | | | IF 1 INFORMATION VALID |
FIG. 3A
| OUTER LINE MULTIPLEXER | | | | | | |
|---|---|---|---|---|---|---|
| SIGN | M1 | M2 | M3 | MSB | LSB | OUTER LINE |
| 0 | 1 | 0 | 0 | 1 | 0 | M3 |
| 0 | 0 | 1 | 0 | 1 | 0 | M1 |
| 0 | 0 | 0 | 1 | 0 | 1 | M2 |
| 1 | 1 | 0 | 0 | 0 | 1 | M2 |
| 1 | 0 | 1 | 0 | 1 | 0 | M3 |
| 1 | 0 | 0 | 1 | 0 | 0 | M1 |
FIG. 3B
| INNER LINE MULTIPLEXER | | | | | | |
|---|---|---|---|---|---|---|
| SIGN | M1 | M2 | M3 | MSB | LSB | INNER LINE |
| 0 | 1 | 0 | 0 | 0 | 1 | M2 |
| 0 | 0 | 1 | 0 | 1 | 0 | M3 |
| 0 | 0 | 0 | 1 | 0 | 0 | M1 |
| 1 | 1 | 0 | 0 | 1 | 0 | M3 |
| 1 | 1 | 1 | 0 | 0 | 0 | M1 |
| 1 | 0 | 0 | 1 | 0 | 1 | M2 |
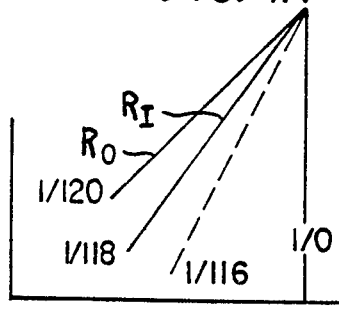
FIG. 1A
FIG. 1B
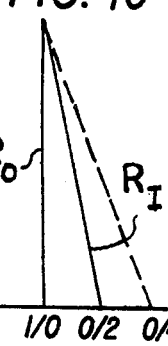
FIG. 1C
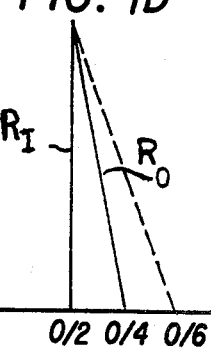
FIG. 1D

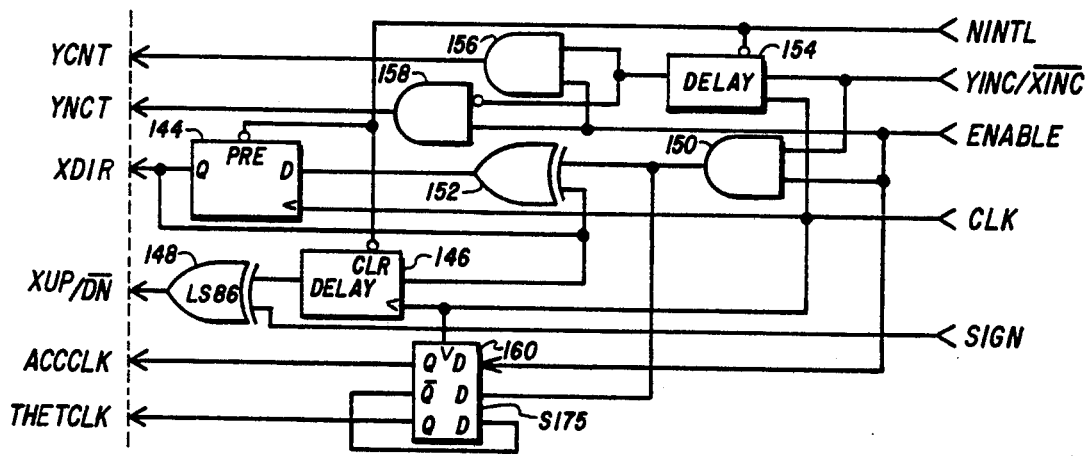
FIGURE 4A
| LN | XDIR | YINC/XINC | OUTPUT |
|---|---|---|---|
| L | 0 | 0 | +1 |
| L | 0 | 1 | $TAN\,\theta_0$ |
| L | 1 | 0 | -1 |
| L | 1 | 1 | $TAN\,\theta_0$ |
FIGURE 5A
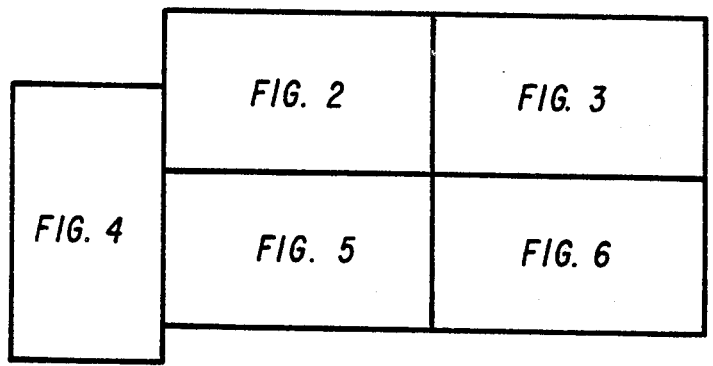
FIGURE M

FIGURE 5

SCAN CONVERTER SYSTEM

BACKGROUND OF THE INVENTION

This application is a continuation-in-part of U.S. patent application Ser. No. 203,746 entitled "Scan Converter System" and filed on Nov. 3, 1980, abandoned.

In ultrasound equipment using a phased-array transducer for producing images of a cross-section of the heart or other organs of a patient, the transducer is periodically pulsed so as to transmit an acoustic wave into the body. During an interval following each pulse, the array is focussed outwardly along a radial line of a sector so as to scan the line and translate the acoustic echoes received from body structure on that line into an analog voltage signal. A straightforward way of displaying this data is to deflect the electron beam of a cathode ray tube along corresponding radial lines and modulate its intensity with the analog voltage signal, but this is highly objectionable because of the voids between the radial lines that increase with range. In an attempt to overcome this problem, the analog voltage signal for each radial line is sampled at uniformly spaced points and each sample is reproduced at the nearest one of display points that are arranged in orthogonal rows and columns. As a result of not filling in all the voids, this technique creates a moiré pattern. The moiré has been reduced by techniques such as reproducing at a display point that is a void the same brightness that was produced at an adjacent display point, but this introduces artifactual boundaries or discontinuities into the image that are highly objectionable.

These problems are entirely eliminated by the invention described and claimed in the patent application referred to because all display points are provided with interpolated data values so as to constitute a full reconstruction of the image. The general manner in which one specie of the invention performs this function will now be explained by reference to FIG. 1 which illustrates the relative location of two radial lines $R_O$ and $R_I$ in a field of display points, x, that are arranged in rows having a separation $K_y$ that are orthogonal to columns having a separation $K_x$. The analog signals along each radial line are sampled so as to produce a data sample $S_{OO}$ at the origin of the radial line $R_O$ and data samples $S_{O1}$ through $S_{O8}$ that are respectively located where $R_O$ intersects arcs $A_1$ through $A_8$ that are concentric with the origin of the radial lines and uniformly spaced by a dimension s. Similarly, data sample $S_{IO}$ is at the origin of the radial line $R_I$ and the data samples $S_{I1}$ through $S_{I8}$ are respectively located where $R_I$ intersects the arcs $A_1$ through $A_8$. The data samples for $R_O$ and $R_I$ are retained in memory while the data samples for the next radial line $R_D$ are being received and placed in the memory.

During the receipt of data from the radial line $R_D$, all the display points between $R_O$ and $R_I$ are addressed in sequence such as indicated by the dash-dot line. As each display point is addressed, the data samples surrounding it are obtained and an interpolated data value to be displayed at that display point is derived from these data samples in the following way. Consider the display point DP located at the end of a radial line R. The radial distance of DP is determined, and if $K_y$ and $K_x$ are expressed in terms of s and are not greater than s, the fractional part of the radius will be RERR' and will also be the ratio, RERR, of the distance between the arc A* on which DP is located and the arc $A_2$ to the arc separation s. RERR is then used to derive a first intermediate interpolated data value $i_{O23}$ at the intersection of A* and $R_O$ from data samples $S_{O2}$ and $S_{O3}$ on $R_O$. RERR is also used to derive a second intermediate interpolated data value $i_{I23}$ from the data samples $S_{I2}$ and $S_{I3}$ on $R_I$ at the intersection of A* and $R_I$.

The ratio $\theta$ERR of the angle $\theta$ERR' between $R_O$ and R to the angle $\Delta\theta$ between $R_O$ and $R_I$ is determined and used in interpolating the first and second intermediate interpolated data values, $i_{O23}$ and $i_{I23}$, so as to derive the final interpolated data value for the display point DP.

As explained in the patent application referred to, RERR and $\theta$ERR are each derived by a process involving the recursive addition of certain constants for each step from one display point to the next, and counters are used to derive the appropriate data samples from the line memory. The values of RERR and the data samples such as $S_{O2}$ and $S_{O3}$ are applied to a ROM so as to derive a first intermediate interpolated data value such as $i_{O23}$ and RERR and data samples such as $S_{I2}$ and $S_{I3}$ are applied to another ROM so as to derive a second intermediate interpolated data value such as $i_{I23}$. The values $i_{O23}$ and $i_{I23}$ and $\theta$ERR are applied to a third ROM so as to derive the final interpolated data value for a display point such as DP.

As more particularly described in a continuation-in-part of the patent application referred to, which was filed on Nov. 2, 1981, Ser No. 317,081 all of the data samples of a sector may be stored in memory and ROMs may be used to select the appropriate samples, derive the same first and second intermediate interpolated data values, and derive the final interpolated data value for a display point in response to signals indicating its coordinates by row and column.

BRIEF DESCRIPTION OF THE INVENTION

In accordance with the invention of this application, the first and second intermediate interpolated data values such as $I_{O23}$ and $I_{I23}$ are derived at points where the rows of display points intersect the radial lines $R_O$ and $R_I$ rather than at the points where they are intersected by the arcs $A_1$ through $A_8$. The first and second interpolated data values are then angularly interpolated to derive final interpolated data values for all display points in the row of display points between them. In order to perform the radial interpolation necessary to derive the intermediate interpolated data value $I_{O23}$, its radial position with respect to the data samples $S_{O2}$ and $S_{O3}$ must be determined and, similarly, the derivation of the intermediate interpolated data sample $I_{I23}$ requires a determination of its radial position with respect to the data samples $S_{I2}$ and $S_{I3}$. If only two radial lines of data samples are to be retained in memory while a third is being stored in memory, one way of determining these radial positions is as follows. Note that when the display point scan drops from the row $r_O$ of display points that passes through the origin O to the next lower row of display points $r_1$, the radius of the intersection of row $r_1$ with $R_O$ has a radius of $\Delta R_O$ and the radius of the intersection of the row $r_1$ with $R_I$ has a radius $\Delta R_I$. From observation, it can be seen that $\Delta R_O = K_y/\cos\theta_O$ and that $\Delta R_I = K_y/\cos\theta_I$. Thus, each time the display point scan drops vertically to the next lower row of display points, the radius of the intersection of that lower row with $R_O$ can be determined by adding $\Delta R_O$ so as to produce $\Sigma\Delta R_O$, and the radius of the intersection of that lower row with $R_I$ can be determined by adding $\Delta R_I$ so as to produce $\Sigma \Delta R_I$. If the uniform spacing s between data samples is the unit of dimension, then the fractional values of $\Sigma \Delta R_O$ and $\Sigma \Delta R_I$ thus determined respectively indicate the radial positions of RERRO and RERRI. Of course, $\Delta R_O$ and $\Delta R_I$ will be different for each radial line. The value of $\theta$ERR required for the interpolation of the first and second intermediate interpolated data values can be obtained in the same way as in the patent application referred to.

Another way of carrying out the present invention is to store all data samples of a sector in memory and program a ROM with the radial positions of the first and second intermediate interpolated data values, $\theta$ERR, the number of one of the radial lines adjacent the display point and the number of one of the data samples to be used in deriving the first or second intermediate interpolated data values. Then, as each display point is identified by row and column, the appropriate samples are selected by a second ROM in response to the line numbers and sample numbers. The two selected samples on one radial line are supplied to a third ROM along with the signal representing one radial position such as RERRO so as to cause the second ROM to output the first intermediate interpolated data value and two selected samples on the other radial line are supplied to a fourth ROM along with the signal representing the other radial position such as RERRI so as to cause the fourth ROM to output the second intermediate interpolated data value. Then the first and second intermediate interpolated data values are supplied to a fifth ROM along with $\theta$ERR so as to cause it to output the final interpolated data value to be used at the identified display point.

BRIEF DESCRIPTION OF THE DRAWINGS

FIGS. 1A, 1B, 1C and 1D are used in explaining the operation of a line transfer ROM shown in FIG. 4;

FIGS. 2-6 taken together illustrate a scan conversion system embodying this invention;

Figure 2:
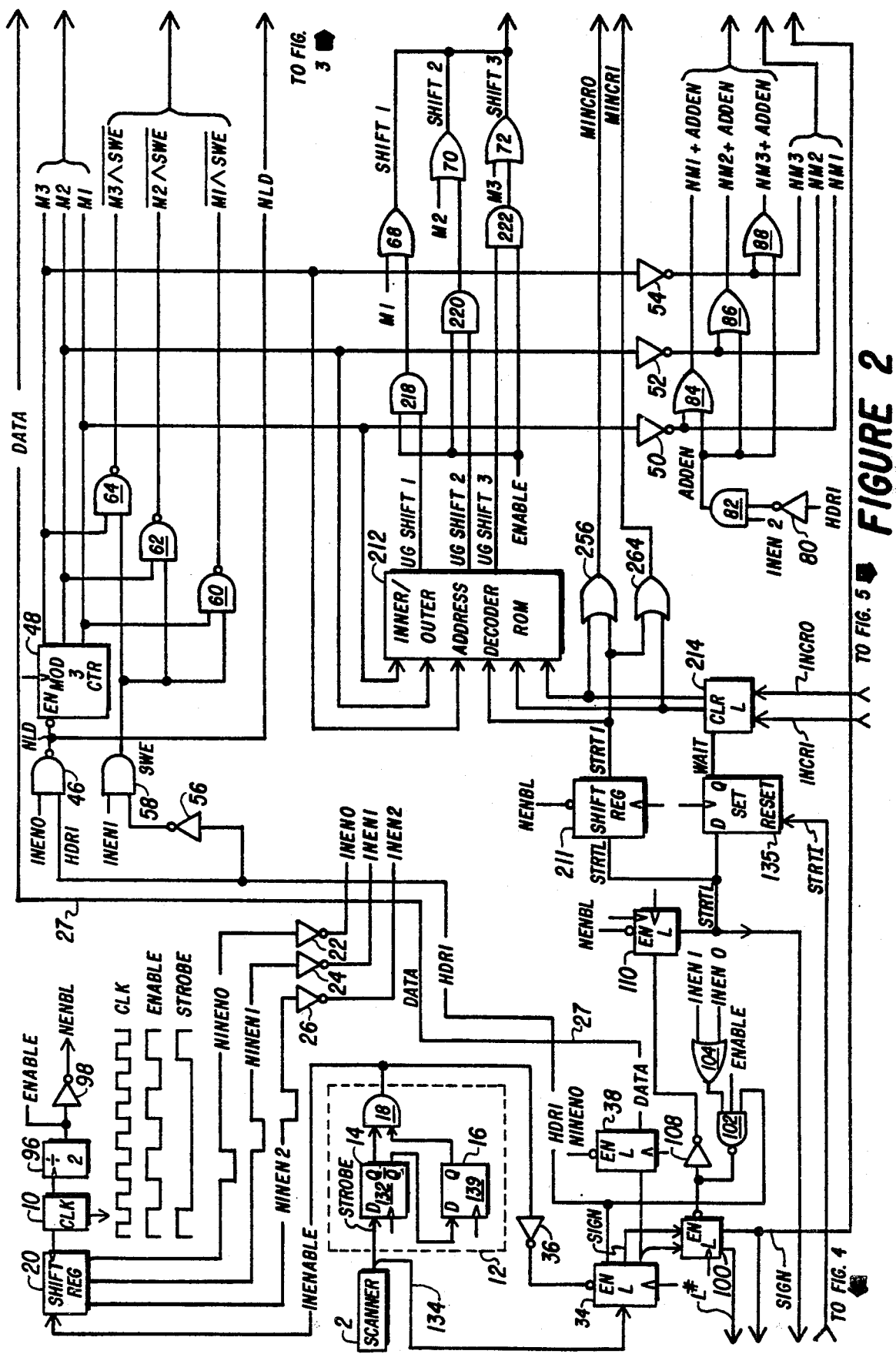
Figure 3:
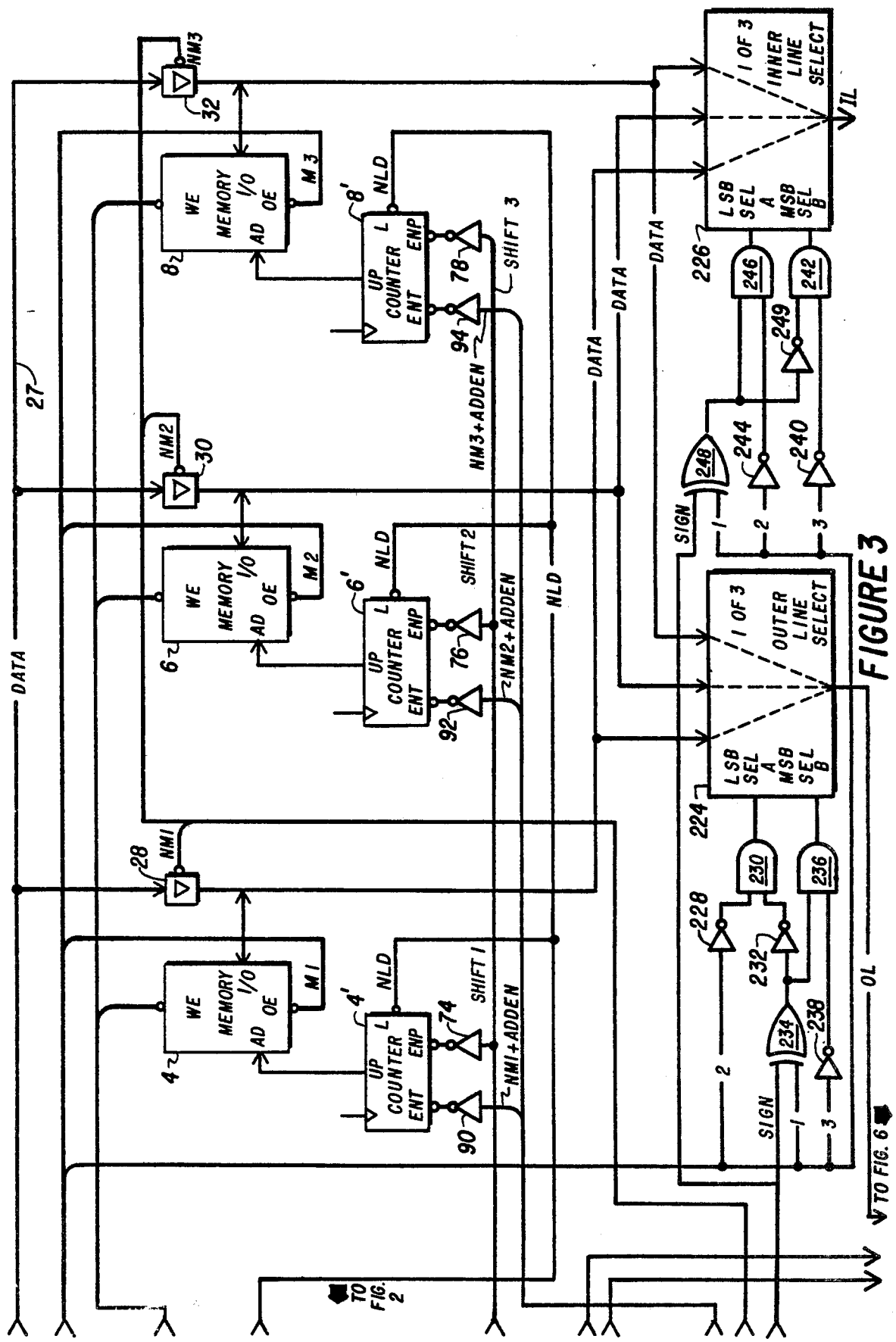
Figure 4:
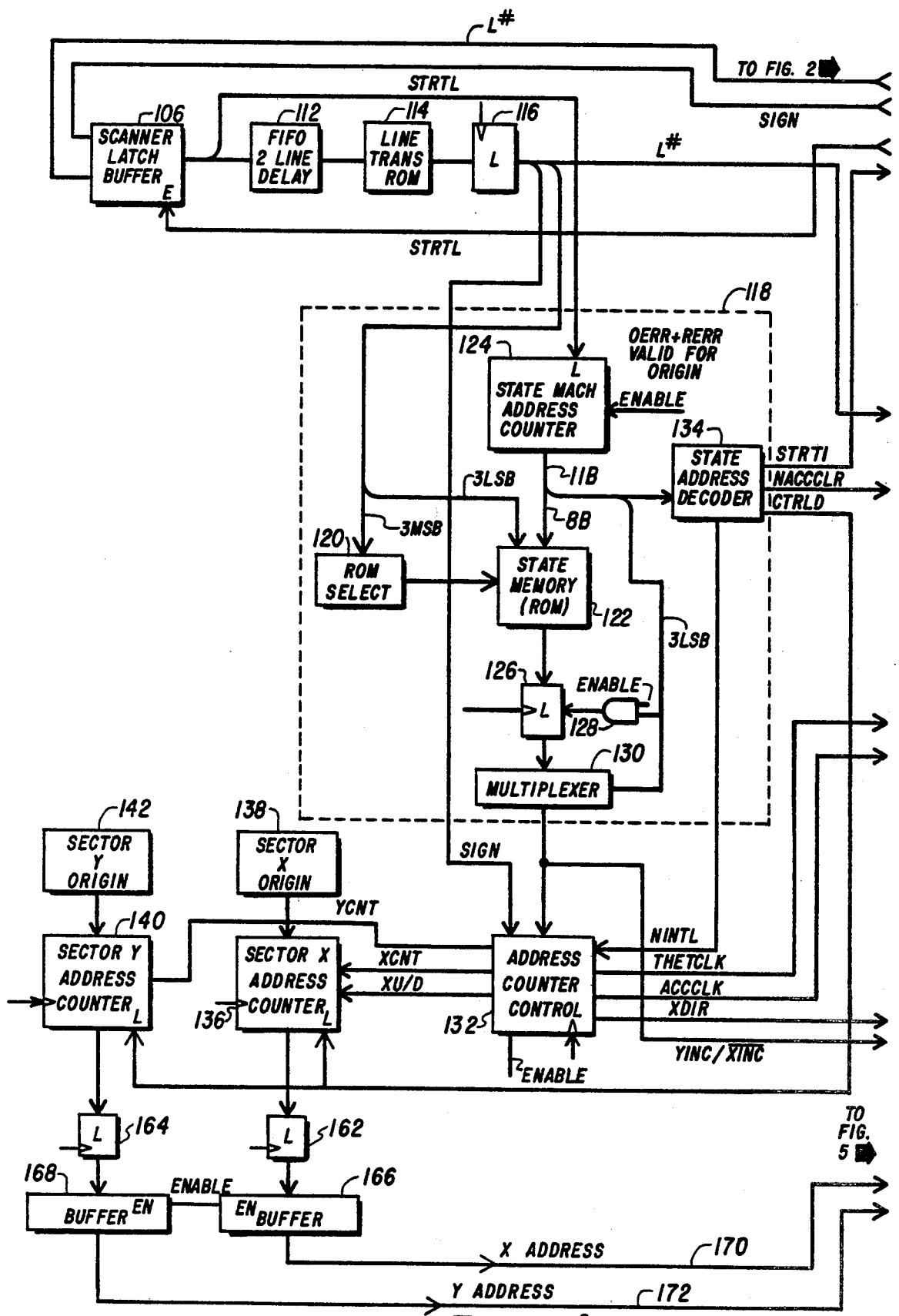
Figure 5:
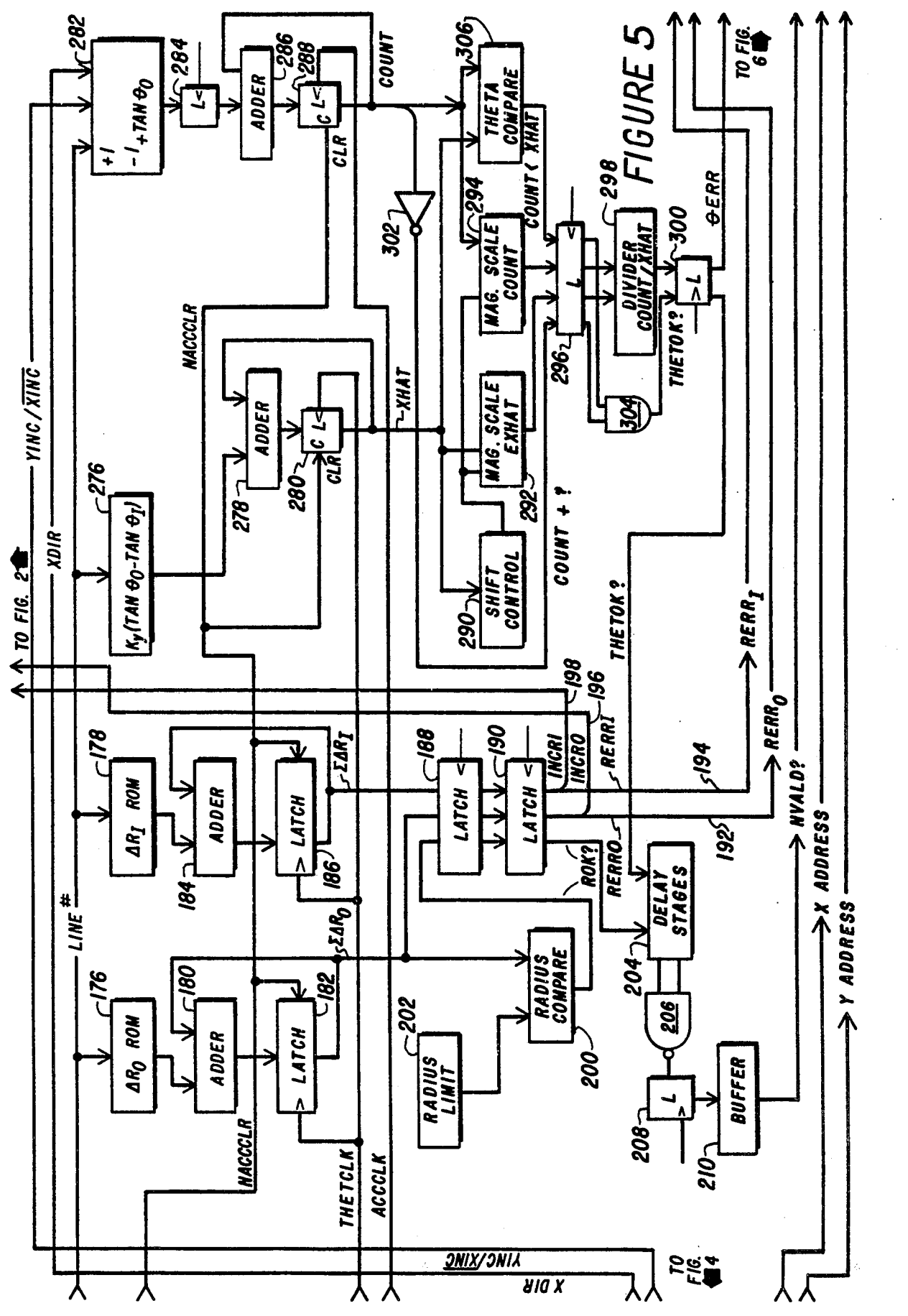
Figure 6:
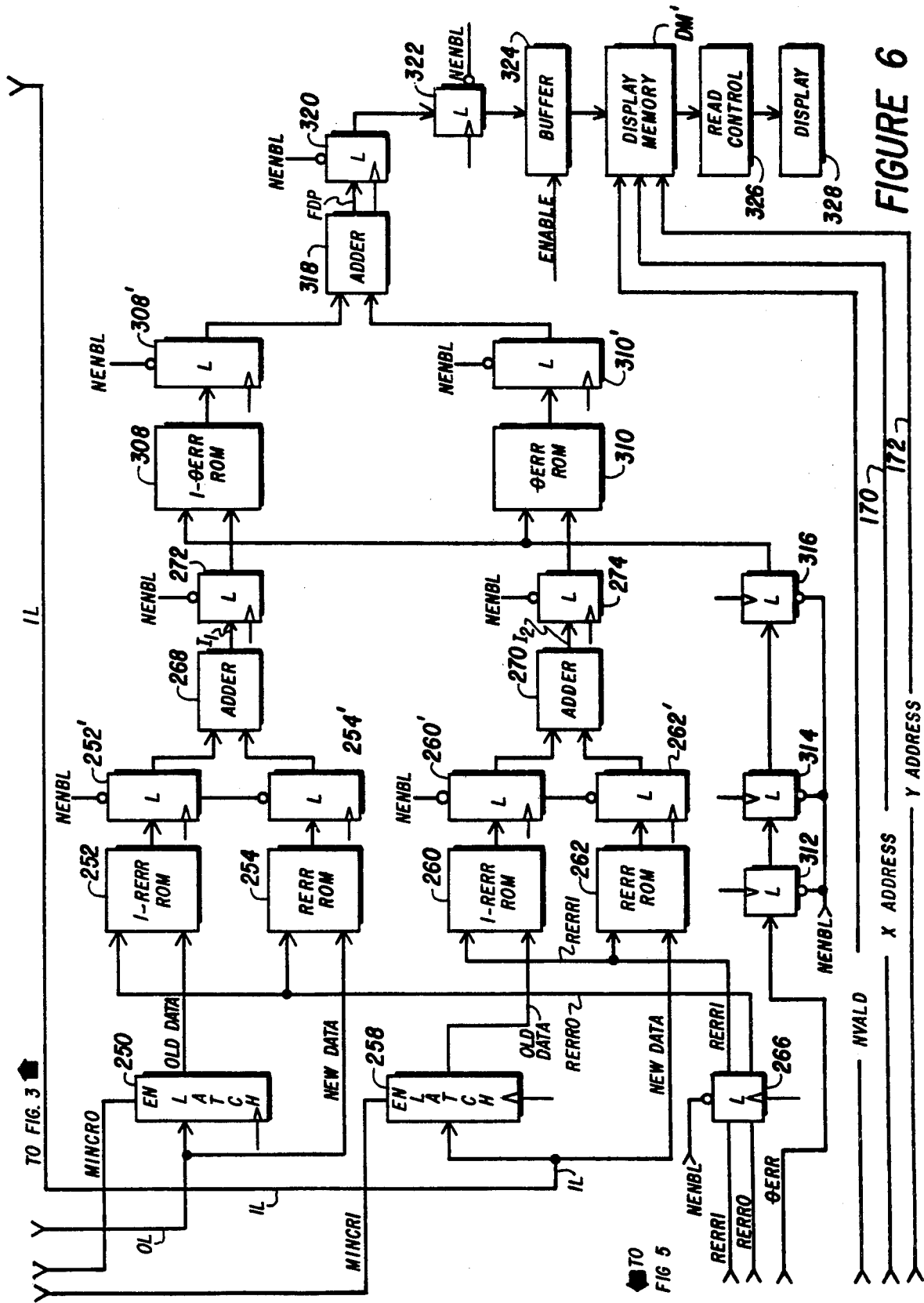
Figures 7, 7A:
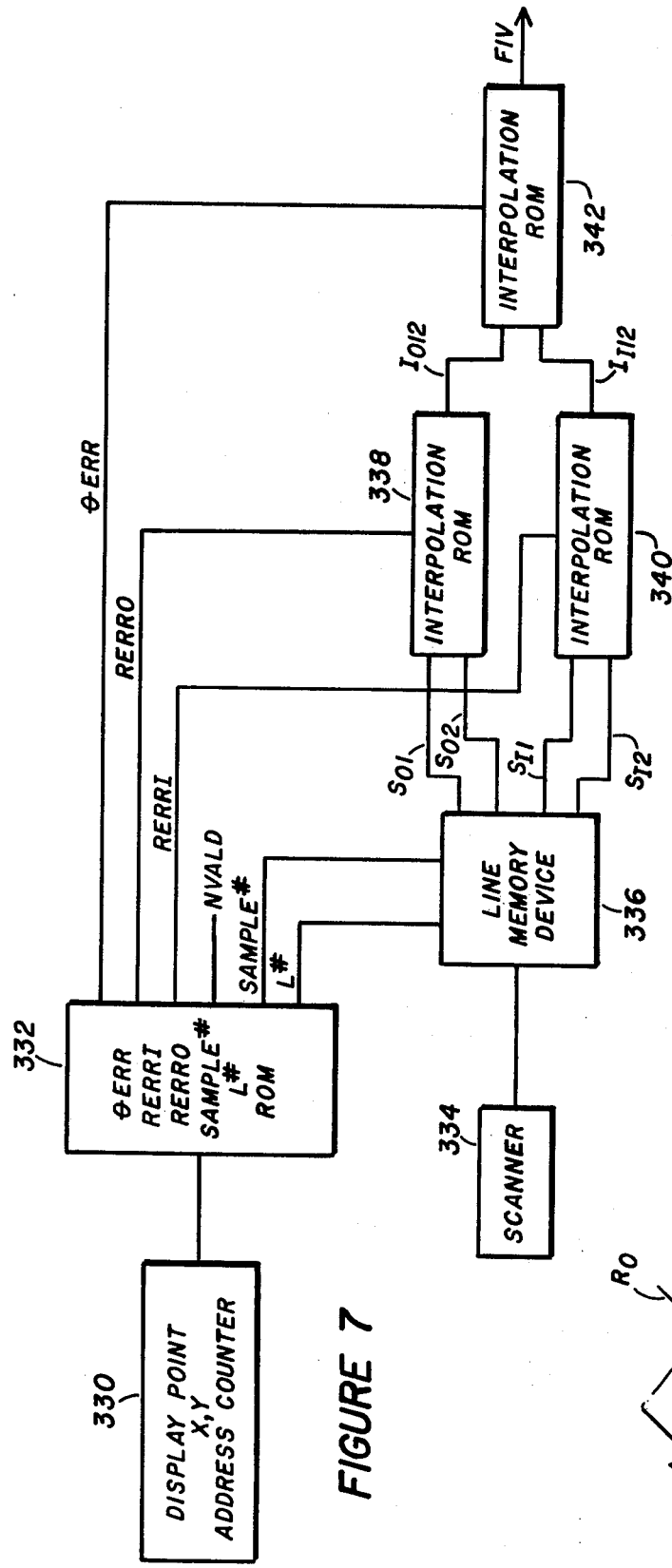

FIG. M indicates the orientation of FIGS. 2-6;

FIG. 2 illustrates the portion of the system providing data samples, line numbers and timing signals;

FIG. 2A illustrates the bits in the words supplied by a data scanner;

FIG. 3 illustrates the memory portion of the system as well as the means for storing and retrieving data samples therefrom as required;

FIGS. 3A and 3B are the respective truth tables for the outer and inner radial line multiplexers of FIG. 3;

FIG. 4 illustrates the portion of the system that controls the scan through the display points contained between radial lines;

FIG. 4A illustrates the details of an address control counter in FIG. 4;

FIG. 5 illustrates the portion of the system that generates signals RERR representing the respective radial positions $\Sigma \Delta R_O$ and $\Sigma \Delta R_I$ of the intersections of rows of display points with $R_O$ and $R_I$ and which also generates signals $\theta$ERR representing the radial position of each display point;

FIG. 5A is a function table for a ROM used in deriving the value of COUNT;

FIG. 6 illustrates the portion of the system that selects the data samples that are to be interpolated so as to respectively provide the intermediate interpolated data values for each radial line, the intermediate interpolated data values and the final interpolated data values;

FIG. 7 illustrates an embodiment of the invention using ROMs; and

FIG. 7A is used in explaining the operation of FIG. 7.

WRITING DATA SAMPLES INTO A LINE MEMORY

Just prior to the transmission of a pulse of acoustic energy, a scanner 2 of FIG. 2 outputs a word illustrated in FIG. 2A having bits two through eight representing the line number from which data samples are about to be received, a most significant bit, HDR, that is high and a least significant bit, STROBE, that becomes high when sufficient time has elapsed for the bits just referred to to be valid. After the pulse of acoustic energy, bits two through six successively represent the values of a succession of data samples from the radial line and each successive change is accompanied by a STROBE pulse indicating when the bits are valid.

During the period of time prior to the transmission of the pulse of acoustic energy, one of the line memories 4, 6 and 8 of FIG. 3 is prepared for the writing of data therein, the other two are prepared to have data read from them and the associated address counters 4', 6' and 8' are reset to zero. These functions require pulses related to STROBE and synchronous with a clock 10 for the scan conversion system, but because STROBE is generally not synchronous with the clock 10, a synchronizing means 12 is provided for deriving from STROBE a corresponding pulse INENABLE that is synchronized with the clock 10. The means 12 may be any known to those skilled in the art, but is shown as being comprised of D flipflops 14 and 16 and an AND gate 18 connected as shown.

The pulses required to control the input data path are derived by applying INENABLE to a shift register 20 which outputs contiguous pulses NINEN0, NINEN1 and NINEN2 and deriving their inverted forms INEN0, INEN1 and INEN2 with inverters 22, 24 and 26. Since the shift register 20 is clocked by pulses from the scan converter system clock 10, the aforesaid pulses are synchronous therewith. It is only essential that all input functions of the line memory be carried out before the next STROBE pulse arrives.

Conveyance of bits two through six, which represent the data samples after the transmission of the pulse of acoustic energy, to a data bus 27 that is coupled to the I/O channels of the line memories 4, 6 and 8 by tri-state buffers 28, 30 and 32 is effected as follows. All bits from the scanner 2 except STROBE are connected to the input of a latch 34 which is enabled by connecting an inverter 36 between the output of the AND gate 18, where INENABLE is, and the low state enable input of the latch. Although the words from the scanner 2 are synchronous with their own STROBE, they generally are not synchronous with INENABLE, but they will be synchronous with INENABLE on the output side of the latch 34 because it is enabled by INENABLE. Bits two through six are conducted from the output of the latch 34 to the input of a latch 38 that is enabled by NINEN0, and the output of the latch 38 is connected to the data bus 27.

The preparation of the line memories 4, 6 and 8 and the zeroing of their address counters just prior to the transmission of each pulse of acoustic energy is accomplished as follows. The most significant bit HDR from the scanner 2, termed HDR1 at the output of the latch 34, is conducted to one input of a NAND gate 46 and INEN0 is applied to the other. Because HDR1 is high during the entire period just prior to the transmission of the acoustic pulse, the NAND gate 46 outputs a low state pulse NLD whenever INEN0 occurs. INEN0 also occurs during the sending of each data sample during the radial line following the acoustic pulse but HDR1 is low for the entire line so that INEN0 then has no effect and NLD is not produced. The pulses NLD are applied to a MOD3 counter 48 which outputs M1, M2 and M3, only one of which is in a high state. The one of M1, M2 and M3 that is in a high state changes in response to each pulse NLD so that after three NLDs have occurred, each of M1, M2 and M3 has been in a high state. Inverters 50, 52 and 54 respectively supply signals NM1, NM2 and NM3.

Refer to FIG. 3. The pulses M1, M2 and M3 are respectively applied to the low state activated output enable inputs of the line memories 4, 6 and 8 and the pulses NM1, NM2 and NM3 are respectively applied to the low state enable inputs of the tri-state buffers 28, 30 and 32. NLD is applied to the low state activated load terminals of the address counters 4', 6' and 8' so as to set them back to zero at the beginning of each radial line. During a radial line when M1 is high, information cannot pass out of the memory 4 via its I/O channel, but because NM1 is low, information can flow to its I/O channel from the data bus 27 via the tri-state buffer 28. The opposite situation prevails with respect to the line memories 6 and 8 so that it is possible to read data from them.

It will be recalled that during the period before the transmission of the acoustic pulse, the bits two through eight represented the L# and that bits two through six were passed through the latches 34 and 38 so as to be on the data bus 27 when one of the memories, such as 4 in the above example, is prepared to receive data. In order to prevent these bits from being stored in a memory when they represent a L#, HDR1 is inverted by an inverter 56, FIG. 2, and applied to one input of an AND gate 58 and INEN1 is applied to the other input. The output of the AND gate 58 is connected to one input of each of NAND gates 60, 62 and 64, and M1, M2 and M3 are respectively applied to the other inputs of these NAND gates. The outputs of the NAND gates 60, 62 and 64, called $\overline{M1ASWE}$, $\overline{M2ASWE}$ and $\overline{M3ASWE}$, are respectively connected to the low state activated write enable inputs of the line memories 4, 6 and 8 of FIG. 3. During the period when the bits two through six represent part of a L#, HDR1 is high, but because it is inverted by the inverter 56, it is low at the input of the AND gate 58 so that its output is low regardless of whether INEN1 is low or high. This prevents the outputs of the NAND gates 60, 62 and 64 from becoming low regardless of the state of M1, M2 or M3 that is applied to their other inputs. Thus, under this condition, none of the write enable inputs of the line memories 4, 6 and 8 receives the low state voltage necessary to enable them to have data written into them. During the period after the transmission of the acoustic pulse, when the bits two through six represent data samples, HDR1 is low so that its inversion by the inverter 56 causes one input of the AND gate 58 to be high for the entire line. When INEN1 occurs, the output of the AND gate 58 goes high so as to produce a high state pulse at one input of each of the NAND gate 60, 62 and 64. The one of them for which M1, M2 or M3 is high will output a low state pulse required to activate the write enable input of the memory to which it is connected, NAND gate 60 in the above example where M1 is high. Thus, during the period after the transmission of an acoustic pulse, the synchronized strobe INENABLE transfers the bits including two through six representing the value of a data sample through the latch 34, NINEN0 then transfers these bits through the latch 38 to the data bus 27. At the time of this latter transfer, INEN0 causes a different one of M1, M2 and M3 to be high so as to select the line memory into which data can be written. Following this, INEN1 produces a low state pulse at the write enable input of the line memory that has been selected so that the data on the bus 27 is written into it.

ADDRESS OF LINE MEMORY BEING WRITTEN INTO

The following circuits advance the address of the line memory being written into for each data sample. M1, M2 and M3 are respectively applied to one input of OR gates 68, 70 and 72 having outputs SHIFT1, SHIFT2 and SHIFT3 that are respectively applied via inverters 74, 76 and 78 to the low state enable inputs ENP of the counters 4', 6' and 8' of FIG. 3. As previously described, the high one of M1, M2 and M3 respectively prepares a corresponding one of the line memories 4, 6 and 8 to receive data samples. The output of the one of the OR gates 68, 70 and 72 to which the high one of M1, M2 and M3 is applied will have a high output regardless of the state of the other input so as to make the ENP input to which that output is coupled low. Thus, if M1 is high, the output of the OR gate 68 is high and the ENP input of the address counter 4' is low.

But in order for a counter to count for each sample, its ENT input must also be made low at the receipt of each sample. This is brought about by the following circuitry. HDR1 is applied to an inverter 80, FIG. 2, having its output connected to one input of an AND gate 82, and INEN2 is applied to the other input. The output, ADDEN, of the AND gate 82 is applied to one input of OR gates 84, 86 and 88, and NM1, NM2 and NM3 from the inverters 50, 52 and 54 are respectively applied to the other inputs of the OR gates 84, 86 and 88. The signal NM1+ADDEN at the output of the OR gate 84 is applied to an inverter 90 of FIG. 3 having its output connected to the ENT input of the address counter 4'; the signal NM2+ADDEN at the output of the OR gate 86 is applied to an inverter 92 having its output connected to the ENT input of the address counter 6'; and the signal NM3+ADDEN at the output of the OR gate 88 is applied to an inverter 94 having its output connected to the ENT input of the address counter 8'. Thus in the above example, when M1 is high and NM1 low, the OR gate 84 will output a high state pulse during each INEN2 applied to the AND gate 82 and cause the address counter 4' to advance one count.

After a pair of radial lines of data samples have been received, two of the line memories 4, 6 and 8 will be full of data samples and data samples will start being written into the third line memory. While data samples are being written into the third line memory, final interpolated data values will be determined from the pair of lines of stored data samples for the display points between those radial lines.

DISPLAY POINT SCANNING

Because all of the devices for performing the functions about to be described, which involve the derivation of the final interpolated data values for each display point in the scan just referred to, are to be clocked at half the rate of the system clock 10, the frequency of the clock 10 is divided in two by a divider 96 so as to produce an output signal ENABLE. An inverter 98 provides its opposite phase NENBL.

Inasmuch as the sequence of scanning steps from display point to display point along the rows and columns of display points as described in connection with FIG. 1 for the radial lines $R_O$ and $R_I$ will be different for each pair of radial lines, it is necessary to identify the pair of radial lines for which data samples are stored in the two line memories. This can be determined from the bits two through eight which represent L# and appear at the output of the latch 34 of FIG. 2 and from the first bit SIGN that is high if the L# is for a radial line in the left half of the sector and low if it is for a radial line in the right half of the sector. The bits two through eight representing L# and the SIGN bit are applied to a latch 100 that is enabled only when these bits represent a line number and before the first data sample is received. This is accomplished by applying HDR1 to one input of a NAND gate 102, ENABLE to another and the output of an OR gate 104 to a third input, the inputs for the OR gate 104 being INEN0 and INEN1, and applying the output of the NAND gate 102 to the low state enable input of the latch 100. HDR1 insures that the output of the NAND gate 102 won't go low and enable the latch 100 unless the bits represent a L#, and ENABLE sets up proper timing. Because HDR1 lasts for the period between successive INENABLEs and there are a number of ENABLE pulses during this time, the NAND gate 102 would go low and undesirably enable the latch 100 as each of the ENABLE pulses occurs. Only one of these ENABLE pulses is selected by the output of the OR gate 104 as the signals INEN0 and INEN1 occur only once for each radial line. The reason for using both of these signals is that ENABLE can come up in either of two phases relative to INENABLE so that if only INEN0 or INEN1 were used, the state of the output of the NAND gate 102 might never change. While data samples are being received, HDR1 is low so that the output of the NAND gate 102 cannot go low and enable the latch 100. Once the latch 100 is enabled, the L# and SIGN appear at its output and are conducted to the input of a scanner latch buffer 106 in FIG. 4.

In addition to providing the L# and SIGN, it is necessary to produce a pulse indicating the start of a radial line. Whereas the low state pulse at the output of the NAND gate 102 occurs at the beginning of a line, the delay in the NAND gate makes its leading edge occur too late for proper timing. Proper timing is achieved by connecting an inverter 108 between the output of the NAND gate 102 and the data input of a latch 110 having its low state activated enable input connected to NENBL. Because of the delay referred to, the low state pulse from the NAND gate 102 may not arrive at the data input of the latch 110 until the NENBL pulse following the ENABLE pulse applied to the NAND gate 102. When the latch 110 is enabled by NENBL, it outputs a pulse called STRTL that is used to indicate the start of a radial line.

Figure 1:
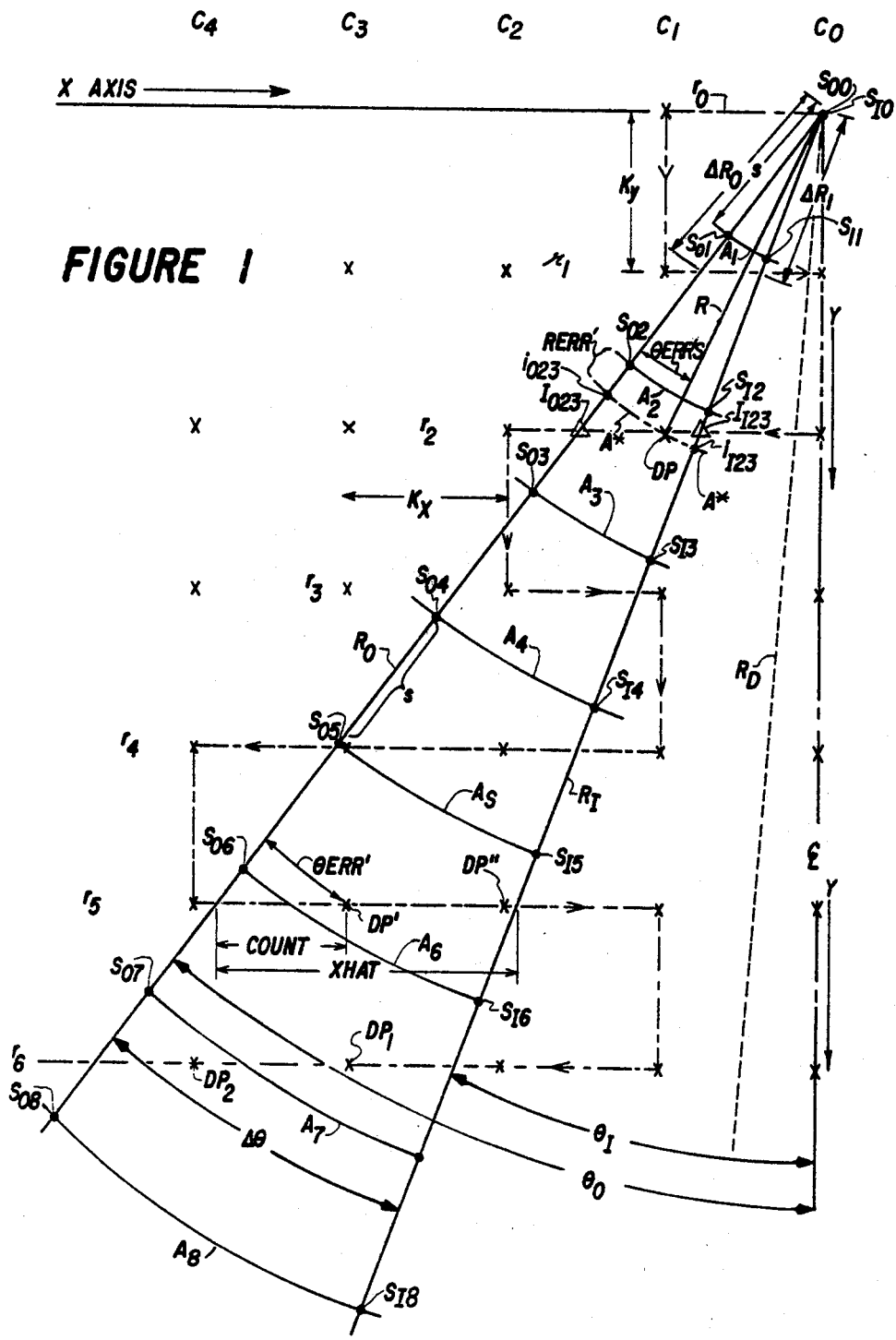
FIG. 1 illustrates the relative locations of data samples and display points as well as the positions of intermediate interpolated data values in the parent application and in this application.

At this point, a radial line such as the dashed line $R_D$ of FIG. 1 along which data samples are about to be received has been identified but the display points for which final interpolated data values are to be determined lie between the two previous radial lines $R_O$ and $R_I$. In this particular embodiment, the information as to the steps to be taken in scanning these display points is always referenced to the outer radial line regardless of the half of the sector in which it is located. $R_O$ of FIG. 1 is the reference line for the left half of the sector and is the oldest line. It is identified as follows. When $R_O$ was the line along which data samples were about to be received, its L# was supplied to the latch 106 of FIG. 4 and was transferred to the output of that latch when the signal STRTL for $R_O$ occurred by applying STRTL to the enable input of the latch. A fifo two-line delay 112 is coupled to the output of the latch 106 so that when the STRTL for $R_D$ occurs, the L# for $R_O$ will be at the output of the delay 112.

Identification of the L# for an outside radial line in the right half of the sector is made by connecting a line transfer ROM 114 to the output of the fifo delay 112. The output of the ROM 114 is applied to a latch 116. As shown in FIGS. 1A, 1B, 1C and 1D, the radial line numbers in each half of the sector decrease by two as the center line is approached. The center line is given the number 0 and is considered to be in the left half sector. Remembering that the oldest radial L# is the oldest line and that its L# is at the output of the fifo delay 112, it can be seen that the L# is the line number for the outside radial line $R_O$ in the left half of the sector until $R_I$ becomes the center line as in FIG. 1B. FIG. 1C illustrates, however, that when the oldest line coincides with the center line, it is not the outer radial line but the inner one. The sequence of steps for scanning the display points between $R_O$ and $R_I$ of FIG. 1B is the mirror image of the sequence of steps for scanning the display points between $R_O$ and $R_I$ of FIG. 1C so that the horizontal steps are in opposite directions. As will be seen, the direction factor can be taken care of by use of SIGN in a manner to be described but the numbers of horizontal steps along a given row of display points is the same. Therefore, the same ROMs can be used to retain information as to the display point scanning for FIGS. 1B and 1C. The fact that the L# at the output of the line fifo 112 is 1/0, the 1 being the value of SIGN and the 0 being the L#, rather than 0/2, is taken care of by using the line transfer ROM 114 to add two to a L# received after 1/0. Thus, the line numbers will be as designated in FIG. 1D from which it can be seen that the line 1/0 has been renumbered to 0/2 and therefore would designate the same scanning path data for the display points as in FIG. 1B, i.e., the data would be that referenced to line number 2 with the opposite SIGN signifying a mirrored scanning path of line 1/2. All subsequent lines on the right side of the sector are incremented by 2.

Now that the L# to which the desired display point scanning data is referenced has been determined, consideration is given to a state machine 118 of FIG. 4 that produces a signal YINC/XINC and a signal XDIR that together define the display point scanning path and the display point for which a final interpolated data value is sought.

The three most significant of the six bits at the output of the latch 116 that represent the line number are applied to a ROM select 120 so as to select one of eight ROMs used in a state memory 122. Each of these ROMs contains the display point scanning data for up to eight pairs of radial lines. The three least significant bits from the latch 116 are applied to the state memory 122 to select the portion within the selected ROM related to the particular pair of radial lines. Each of the latter portions contains 256 eight-bit words so as to have a total of 2048 bits. Each bit corresponds to one step along a row or column of display points in the path to be scanned through the display points. It is 0 if the step is in either direction along the x axis, and it is 1 if the step is along the y axis.

The signal STRTL used to enable the scanner latch buffer 106 appears at its output and is applied so as to load a state machine address counter 124 with a count that compensates for delays in subsequent circuits. The counter 124 successively outputs eleven-bit counts at the rate of the ENABLE pulses applied to it. Eight of these eleven bits are applied so as to sequentially select one of the 256 eight-bit words for each pair of lines that are in the selected portion of the memory 122 and supply them to a latch 126. The three LSBs of the eleven bits at the output of the state machine address counter 124 are ANDed with ENABLE in an AND gate 128 to enable the latch 126 to pass the eight-bit byte applied to it from the state machine memory 122 to a multiplexer 130 which selects the bits of the word in sequence under the control of the three LSBs and applies them to an address counter control 132. The output of the multiplexer 130 is a signal YINC/$\overline{\text{XINC}}$.

STATE ADDRESS DECODER

The eleven-bit word at the output of the state machine address counter 124 is applied to a state address decoder 134, which is a ROM, so as to develop timing signals corresponding to predetermined counts. When the eleven-bit word reaches a count occurring after enough time has elapsed for calculations of $\theta$ERR, INCRI, INCRO, RERRI and RERRO of FIG. 5 to have been completed in a manner to be explained in connection with FIG. 5, a signal STRTI, start interpolating, is sent to the reset input of a latch 135 in FIG. 2, the purpose of which will be explained subsequently. At an appropriate time, the state address decoder 134 sends, for reasons to be set forth, a signal NACCCLR at the beginning of each line to clear four latches in the circuits of FIG. 5 to be described that determine $\Sigma\Delta R_O$, $\Sigma\Delta R_I$, COUNT and XHAT. The state address decoder 134 also outputs a signal NINTL that is connected to an address counter control 132 so as to initialize its output at a proper time and a signal CTRLD that repeatedly sets an x address counter 136 to the x address of the origin of the sector as determined by a source 138 and sets a y address counter 140 to the y address of the origin as determined by a source 142 at the beginning of each line.

ADDRESS CONTROL

As will be explained in connection with FIG. 4A, the address counter control 132 provides a signal XCNT to the x counter 136 for each 0 in the output of the multiplexer 130, a signal YCNT to the y counter 140 for each 1 in the output of the multiplexer 130, and a signal XU/D to the x counter 136 to indicate whether its count should increase or decrease. In addition, the address counter control 132 provides a signal XDIR that together with YINC/$\overline{\text{XINC}}$ from the multiplexer 130 and SIGN defines the scanning path of the display points. XDIR and YINC/$\overline{\text{XINC}}$ are used in a manner to be explained to identify the value of the trigonometric functions used by the circuits of FIG. 5 that determine the values of XHAT and COUNT which, as will be explained, are used in determining $\theta$ERR. A signal ACCCLK provided by the address counter control 132 clocks the latch of an accumulator of FIG. 5 used in determining the value of COUNT, and a signal THETCLK provided by the control 132 is used to clock a latch of an accumulator of FIG. 5 used in determining the value of XHAT as well as latches used in determining the value of $\Sigma\Delta R_O$ and $\Sigma\Delta R_I$.

Refer now to FIG. 4A for a description of the details of the address counter control 132. At the start of every line, the signal NINTL from the state address decoder 134 of FIG. 4 goes low and is applied to the preset input of a D flipflop 144 so as to make XDIR go to a high state signalling a step along the x axis toward the outside radial line (see row $r_0$ of FIG. 1), but the direction with respect to the origin has not been determined. NINTL also clears an eight-stage delay 146 so as to make its output low. The output of the delay 146 is connected to one input of an XOR gate 148 and the input of the delay 146 is connected to the output of the flipflop 144 where XDIR is. The other input of the XOR gate 148 is connected so as to receive the SIGN bit from the latch 116 of FIG. 4. The output of the XOR 148 is XUP/$\overline{\text{DN}}$. If the radial line is in the left half of the sector, SIGN is high so that the output of the XOR 148 is low signifying a count down, i.e., to the left. If the line is in the right half of the sector, SIGN is low so that the output of the XOR 148 is high signifying a count up.

Control of XDIR is achieved as follows. YINC/$\overline{\text{XINC}}$, i.e., the steps in x and y, from the multiplexer 130 of FIG. 4 are applied to one input of an AND gate 150 and ENABLE is applied to the other. If the next step is still outward, YINC/$\overline{\text{XINC}}$ is 0 so that the output of the AND gate 150 is low. This output is applied to one input of an XOR 152 and XDIR, which is at the output of the D flipflop 144, is applied to the other input. Since XDIR is high for an outward movement, the output of the XOR 152 is high and XDIR remains high. But if YINC/$\overline{\text{XINC}}$ is 1, indicating a movement away from the origin along the y axis, the output of the AND gate 150 is now high when an ENABLE occurs so as to cause the output of the XOR 152 to become low and make XDIR low signifying a step toward the center of the sector with the next movement in x.

Now that the direction of a step along the x axis and XUP/$\overline{\text{DN}}$ is known, it remains to provide the signal XCNT for every step in x. To do this, YINC/$\overline{\text{XINC}}$ is applied to a nine-stage delay 154 that is also cleared by NINTL. The output of the delay 154 is connected to one input of an AND gate 156 and to an inverting input of an AND gate 158, and ENABLE is applied to the other inputs of both. If YINC/$\overline{\text{XINC}}$ is low, the output of the AND gate 156 is low so that there is no count in y, but the output of the AND gate 158 is high so that XCNT is high and causes the sector x address counter 136 to count up or down, depending on whether XUP/$\overline{\text{DN}}$ is high or low.

If YINC/$\overline{\text{XINC}}$ is high indicating a step in y, the output of the AND gate 156 goes high causing the sector y address counter to count up, the only way it can go in this particular embodiment.

The purpose of the delays 146 and 154 is to allow for previous data to clear through the interpolators of FIG. 6. They are clocked by CLK from the clock 10 after ENABLE qualifications. However, the D flipflop 144 is clocked by CLK only.

CLK is also applied to the clock input of a synchronizer 160 having one D input connected to ENABLE so as to produce a signal ACCCLK at the corresponding output. Another D input of the synchronizer 160 is connected to the output of the AND gate 150, the corresponding $\overline{Q}$ output is connected to a third D input, and its corresponding Q output provides the signal THETCLK which is synchronized with ENABLE and occurs whenever the display point scan drops from one row to the next.

The outputs of the x and y address counters 136 and 140 of FIG. 4 are respectively connected to latches 162 and 164 that, in turn, are respectively connected to buffers 166 and 168, both of which have ENABLE applied to their enable inputs. Thus, at each ENABLE, the x and y addresses of the display point for which a final interpolated data value is sought are respectively applied to leads 170 and 172 that pass along the bottom of FIG. 5 to a display memory DM' of FIG. 6.

DETERMINATION OF RERRO, RERRI, INCRO AND INCRI

The L# for $R_O$ from the latch 116 of FIG. 4 is applied to ROMs 176 and 178 of FIG. 5 so as to select the corresponding values of $\Delta R_O$ and $\Delta R_I$. The L# for $R_I$ does not have to be specified because $\Delta R_I$ is for the next inner radial line.

The output of the $\Delta R_O$ ROM 176 is applied to one input of an adder 180, and its output is connected to a latch 182, the output of which is connected to the other input of the adder 180 so as to form an accumulator. At the beginning of each radial line, the signal NACCCLR from the state address decoder 134 of FIG. 4 clears the latch 182 and THETCLK from the address control counter 132 of FIG. 4 clocks it at each step from one row of display points to the next. Thus, at any display point in the scan, the radius of the intersection of its row of display points with $R_O$ is $\Sigma \Delta R_O$ appearing at the output of the latch 182. Note that this sum includes both an integer and a fractional part, with the fractional part ultimately becoming RERRO.

The value of $\Sigma \Delta R_I$ is determined in a similar manner by an adder 184 and latch 186 coupled so as to form an accumulator; however, as will be seen, $\Sigma \Delta R_I$ does not keep the sum of integer overflows since it is not needed. The latch 186 is cleared by NACCCLR and is activated by THETCLK.

Both $\Sigma \Delta R_O$ and $\Sigma \Delta R_I$ are passed through latches 188 and 190. If $\Sigma \Delta R_O$ and $\Sigma \Delta R_I$ are expressed in terms of the radial separation s between display samples, the fractional parts of $\Sigma \Delta R_O$ and $\Sigma \Delta R_I$ will be RERRO and RERRI respectively and are conducted to interpolating circuits of FIG. 6 via leads 192 and 194.

$INCR_O$ and $INCR_I$, that respectively indicate when the intersection of a row of display points with $R_O$ and $R_I$ has passed beyond one of the arcs $A_1$ through $A_8$, are indicated by the carry bits in the adders 180 and 184 that occur when $\Sigma \Delta R_O$ and $\Sigma \Delta R_I$ pass through integral values of the separation s between data samples. The carry bit, INCRO, from the adder 180 passes through the latches 182, 188 and 190 and is separated from the other bits so as to appear on a lead 196; and the carry bit; INCRI, from the adder 184 passes through the latches 186, 188 and 190 and is separated from the other bits so as to appear on a lead 198.

Final interpolated data values for display points in a row that intersects $R_O$ at a radius greater than a predetermined limit are prevented from being entered into the display memory DM' and FIG. 6 in the following manner. $\Sigma \Delta R_O$ is compared in a comparator 200 with a radius limit supplied by a source 202 so as to provide a signal ROK? If the radius of the intersection of a row of display points with $R_O$ is less than the maximum. This signal is passed through latches 188 and 190 and via delay stages 204 to one input of a NAND gate 206 having an output connected via a latch 208 to a buffer 210. The output, NVALD?, of the buffer 210 is applied to the display memory DM' of FIG. 6 in such manner as to determine whether or not the final interpolated data value for the display point is to be entered therein. If the radius of the intersection is greater than the radial limit from the source 202, NVALID? will prevent the final interpolated data value for the display point from being written into DM'. Inasmuch as $\Sigma \Delta R_I$ is always less than $\Sigma \Delta R_O$, it is not used to determine when the radius of a display point exceeds the maximum so that its integral portion is not needed.

READING DATA SAMPLES FROM LINE MEMORIES

The reading function is as follows. At the beginning of every radial line, the signal NLD clears the address counters 4', 6' and 8' of FIG. 3 to zero so that the samples $S_{O0}$ and $S_{I0}$ at the origins of the line memories to be read from are made available at their I/O channels and to the interpolation means, but radial interpolation cannot take place until two successive data samples on a radial line are simultaneously provided. If the counters for the line memories respectively remained at the zero address until the first INCRO is produced at the intersection of the display point row $r_1$ and $R_O$, FIG. 1, and the first INCRI is produced at the intersection of the display point row $r_1$ and $R_I$, samples $S_{O0}$ and $S_{O1}$ would be the successive data samples supplied to the interpolation means for the outside line $R_O$, and $S_{I0}$ and $S_{I1}$ would be the successive data samples provided to the interpolation means for the inside line $R_I$. Unfortunately, however, these are the wrong data samples for obtaining interpolated values at the intersection of $r_1$ with $R_O$ and $R_I$. The proper data samples are $S_{O1}$ and $S_{O2}$ for $R_O$ and $S_{I1}$ and $S_{I2}$ for $R_I$. As will be seen, means are provided for advancing the counters before INCRO and INCRI occur so that the data samples $S_{O1}$ and $S_{I1}$ respectively take the place of $S_{O0}$ and $S_{I0}$. Then when INCRO and INCRI do occur, the proper data samples are provided. From this point on, the advances of the counters for the line memories being read from are brought about by INCRO and INCRI.

As explained in connection with the writing function, the high one of M1, M2 and M3 conditions one of the line memories 4, 6 and 8 respectively to receive data samples for an entire line. The other two of M1, M2 and M3 are low so that the corresponding ones of NM1, NM2 and NM3 would be high. Inasmuch as these latter signals are respectively coupled to the ENT inputs of the counters 4', 6' and 8' via inverters 90, 92 and 94, the two which are high will condition the counters to which they are coupled for counting, but the counting occurs when the corresponding ones of SHIFT1, SHIFT2 or SHIFT3 go high because they are coupled to the ENP inputs of the counters 4', 6' and 8' by inverters 74, 76 and 78.

Control of the signals SHIFT1, SHIFT2 and SHIFT3 is effected as follows by circuits in FIG. 2. The STRTL signal at the output of the latch 110 occurs at the beginning of each line and is applied to a shift register 211 that is enabled by NENBL. Its output, STRT1, is applied to one input of an inner/outer address decoder ROM 212. M1, M2 and M3 and SIGN are applied to other inputs. The signals INCRO and INCRI on the leads 196 and 198 of FIG. 5 are applied to a latch 214. The latch 214 is cleared at the beginning of each radial line by connecting its clear input terminal to the output of the latch 135 that is set by STRTL. As previously noted, when enough time has elapsed for the functions of FIG. 5 to have been completed, the state address decoder 134 of FIG. 4 outputs a signal STRTI, start interpolating, which is applied to the reset input of the latch 135 so as to allow transfer of any INCRO or INCRI which may be present at the input of the latch 214 to its respective outputs. These outputs are respectively connected to other inputs of the ROM 212. The ROM 212 has three outputs UGSHIFT1, UGSHIFT2 and UGSHIFT3 that are respectively connected to inputs of AND gates 218, 220 and 222. The other inputs of these AND gates are connected to ENABLE, and their outputs are respectively connected to different inputs of the OR gates 68, 70 and 72 than those to which M1, M2 and M3 are connected.

In the previous example wherein it was assumed that M1 was high so that the data samples would be written into the line memory 4, it was pointed out that the application of M1 to one input of the OR gate 68 would cause its output SHIFT1 to go high regardless of the state of its other input, which is now seen to be connected to the output of the AND gate 218. In such case, M2 and M3 would be low so that the respective outputs SHIFT2 and SHIFT3 of the OR gates 70 and 72 could become high only if the respective outputs of the AND gates 220 and 222 are high, and this occurs when UGSHIFT2 and UGSHIFT3 are respectively high. As noted, if SHIFT2 goes high, the counter 6' advances one address and if SHIFT3 goes high, the counter 8' advances one address.

Consideration is now given to the truth table for the ROM 212 set forth below for a brief description of the manner in which the desired operation is attained. The first three rows, bracket A, illustrate the situation where STRT1, which occurs at the very beginning of a line, is high. Regardless of which line is being written into, the SHIFT signals for the other two lines, which are being read from, go high so as to advance their counters. This is the extra counter advance previously referred to that is made in order that the data samples presented to the interpolation means may be correct. The x's for INCRO, INCRI and SIGN show that whether these are high or low makes no difference.

The rest of the rows illustrate the situations that can occur during the line when STRT1 is low. In the three rows in bracket B, neither INCRO or INCRI go high so that the SHIFT signals for the lines being read from do not go high. The SHIFT signals that are high are the ones caused by M1, M2 or M3 as explained in connection with the writing function. The rows in bracket C illustrate situations for lines in the left half of the sector and the rows in bracket D illustrate situations for lines in the right half of the sector. It is thought that the rest of the truth table is self-explanatory.

| | STRT1 | INCRO | INCRI | M1 | M2 | M3 | SIGN | UGSHIFT1 | UGSHIFT2 | UGSHIFT3 |
|---|---|---|---|---|---|---|---|---|---|---|
| A | 1 | x | x | 1 | 0 | 0 | x | 0 | 1 | 1 |
| A | 1 | x | x | 0 | 1 | 0 | x | 1 | 0 | 1 |
| A | 1 | x | x | 0 | 0 | 1 | x | 1 | 1 | 0 |
| B | 0 | 0 | 0 | 1 | 0 | 0 | 1 | 1 | 0 | 0 |
| B | 0 | 0 | 0 | 0 | 1 | 0 | 1 | 0 | 1 | 0 |
| B | 0 | 0 | 0 | 0 | 0 | 1 | 1 | 0 | 0 | 1 |
| C | 0 | 1 | 0 | 1 | 0 | 0 | 1 | 1 | 0 | 1 |
| C | 0 | 1 | 0 | 0 | 1 | 0 | 1 | 1 | 1 | 0 |
| C | 0 | 1 | 0 | 0 | 0 | 1 | 1 | 0 | 1 | 1 |
| C | 0 | 0 | 1 | 1 | 0 | 0 | 1 | 1 | 1 | 0 |
| C | 0 | 0 | 1 | 0 | 1 | 0 | 1 | 0 | 1 | 1 |
| C | 0 | 0 | 1 | 0 | 0 | 1 | 1 | 1 | 0 | 1 |
| C | 0 | 1 | 1 | 1 | 0 | 0 | 1 | 1 | 1 | 1 |
| C | 0 | 1 | 1 | 0 | 1 | 0 | 1 | 1 | 1 | 1 |
| C | 0 | 1 | 1 | 0 | 0 | 1 | 1 | 1 | 1 | 1 |
| D | 0 | 0 | 0 | 1 | 0 | 0 | 0 | 1 | 0 | 0 |
| D | 0 | 0 | 0 | 0 | 1 | 0 | 0 | 0 | 1 | 0 |
| D | 0 | 0 | 0 | 0 | 0 | 1 | 0 | 0 | 0 | 1 |
| D | 0 | 1 | 0 | 1 | 0 | 0 | 0 | 1 | 1 | 0 |
| D | 0 | 1 | 0 | 0 | 1 | 0 | 0 | 0 | 1 | 1 |
| D | 0 | 1 | 0 | 0 | 0 | 1 | 0 | 1 | 0 | 1 |
| D | 0 | 0 | 1 | 1 | 0 | 0 | 0 | 1 | 0 | 1 |
| D | 0 | 0 | 1 | 0 | 1 | 0 | 0 | 1 | 1 | 0 |
| D | 0 | 0 | 1 | 0 | 0 | 1 | 0 | 0 | 1 | 1 |
| D | 0 | 1 | 1 | 1 | 0 | 0 | 0 | 1 | 1 | 1 |
| D | 0 | 1 | 1 | 0 | 1 | 0 | 0 | 1 | 1 | 1 |
| D | 0 | 1 | 1 | 0 | 0 | 1 | 0 | 1 | 1 | 1 |

DERIVATION OF DATA SAMPLES FOR RADIAL INTERPOLATION

Now that the samples for the radial lines $R_O$ and $R_I$ have been respectively stored in two of the line memories 4, 6 and 8 and means have been provided for respectively reading them at the proper time, as just described, it is essential that the proper two data samples be applied to the means for performing radial interpolation. For example, in deriving the intermediate interpolated data value $I_{O23}$ of FIG. 1, the samples $S_{O2}$ and $S_{O3}$ must be provided and in deriving the intermediate interpolated data value $I_{I23}$, the samples $S_{I2}$ and $S_{I3}$ must be provided. It is also apparent that angular interpolation of $I_{O23}$ and $I_{I23}$ requires knowing which is for the outside radial line $R_O$ and which is for the inner radial line $R_I$, regardless of which half of the sector $R_O$ and $R_I$ are in.

This latter function is performed by multiplexers 224 and 226 in FIG. 3, the truth tables for which are respectively shown in FIGS. 3A and 3B. Different inputs of each multiplexer are respectively connected to the I/O channels of each of the line memories 4, 6 and 8 and are controlled as described below so that the multiplexer 224 directs data samples from the outer radial line $R_O$ to a bus OL and the multiplexer 226 directs data samples from the inner radial line $R_I$ to a bus IL.

The control for the multiplexer 224 is comprised of an inverter 228 connected between a source of the signal M2 and one input of an AND gate 230 and an inverter 232 coupled between the output of an XOR gate 234 and the other input of the AND gate 230. The XOR 234 has the signals SIGN and M1 respectively applied to its inputs. The output of the XOR 234 is also applied to one input of an AND gate 236, and the signal M3 is applied to its other input via an inverter 238. The output of the AND gate 230 is applied to the LSB, select A, input of the multiplexer 224 and the output of the AND gate 236 is applied to the MSB, select B, input of the multiplexer 224. With these connections, the outer lines will be selected as indicated in the table of FIG. 3A and applied to the outer line bus OL.

The control for the multiplexer 226 is comprised of an inverter 240 connected between a source of the signal M3 and one input of an AND gate 242, an inverter 244 connected between a source of M2 and one input of an AND gate 246, an XOR 248 having one input connected to a source of SIGN and the other input connected to a source of M1. The output of the XOR 248 is connected to an input of the AND gate 246 and also via an inverter 249 to an input of the AND gate 242. The output of the AND gate 246 is connected to the LSB, select A, input of the multiplexer 226, and the output of the AND gate 242 is connected to the MSB, select B, input of the multiplexer 226. With these connections, the inner line will be selected as indicated in FIG. 3B and applied to the inner line bus IL.

RADIAL INTERPOLATION

For radial interpolation, the bus OL on which the data samples for the outside radial line $R_O$ appear is connected to the data input of a latch 250 and its output is connected to one input of a (1−RERR) ROM 252. OL is also connected to a data input of a (RERR) ROM 254. Initially, when the address counters 4', 6' and 8' of FIG. 3 have been reset by the signal NLD, the data sample $S_{OO}$ of FIG. 1 is on the bus OL and at the inputs of the latch 250 and the ROM 254. At this point, the output of the latch 250 is meaningless. STRT1, at the output of the shift register 211 of FIG. 2, and INCRO, which is at the output of the latch 214, are respectively connected to the inputs of an OR gate 256, the output of which, MINCRO, is connected to the enable input of the latch 250. STRT1, which is a delayed STRTL, will transfer the data sample $S_{O1}$ from the latch 250 to the (1−RERR) ROM 252 and will, because of the ROM 212, cause the counter for the line memory 4, 6 or 8 in which the data samples are stored for $R_O$ to advance so as to place the next data sample $S_{O1}$ on OL and therefore at the inputs of the latch 250 and the ROM 254. The reason for the delay of STRT1 by the shift register 211 is to permit time for the first data sample $S_{OO}$ to be stored in the line memory. Thus, old data such as $S_{OO}$ is at the input of the (1−RERR) ROM 252, and new data such as $S_{O1}$ is at the input of the (RERR) ROM 254. When the first INCRO, the one at the intersection of $r_1$ and $R_O$, occurs, it enables the latch 250 so as to pass $S_{O1}$ to the ROM 252 and advances the address counter for the line memory so as to place $S_{O2}$ at the ROM 254 and at the input of the latch 250. Thus, the data sample applied to the ROM 252 is the one that occurs just before the data sample applied to the ROM 254.

The IL bus on which the data samples for the inner line appear is connected to the data input of a latch 258 and its output is connected to one input of a (1−RERR) ROM 260. IL is also connected to a data input of a (RERR) ROM 262. The latch is enabled by the output MINCRI of an OR gate 264 having its inputs respectively connected to the INCRI output of the latch 214 and STRT1 at the output of the shift register 211. Thus, old and new data on IL is respectively connected to the (1−RERR) ROM 260 and the (RERR) ROM 262. The signal RERRO from the latch 190 which is on the lead 192 of FIG. 5 is applied via a latch 266 that is enabled by NENBL to inputs of the ROMs 252 and 254, and the signal RERRI from the latch 190 that is on the lead 194 is applied via the latch 266 to the inputs of the ROMs 260 and 262.

In performing the interpolation, the ROM 252 is programmed to multiply an inner data sample such as $S_{O2}$ of FIG. 1 by (s−RRR') and the ROM 254 is programmed to multiply an outer data sample such as $S_{O3}$ by RERR'. The outputs of the ROMs 252 and 254 are respectively applied to latches 252' and 254', and their outputs are applied to an adder 268 which outputs an intermediate interpolated data value such as $I_{O23}$ of FIG. 1. Similarly, the ROM 260 is programmed to multiply an inner data sample such as $S_{I2}$ of FIG. 1 by (s−RERR') and the ROM 262 is programmed to multiply the outer data sample such as $S_{I3}$ by RERR'. The outputs of the ROMs 260 and 262 are respectively applied to latches 260' and 262', and their outputs are applied to an adder 270 which outputs an intermediate interpolated data value such as $I_{I23}$. The intermediate interpolated data values at the outputs of the adders 268 and 270 are respectively applied to latches 272 and 274 that are enabled by NENBL.

ANGULAR INTERPOLATION

Having derived the intermediate interpolated data values such as $I_{O23}$ and $I_{I23}$ that are respectively at the intersections of the row $r_2$ of display samples with $R_O$ and $R_I$, it is necessary to derive $\theta$ERR' for each display point between them in order that these intermediate values may be interpolated to derive the final interpolated value for that display point. The manner in which this is done can be understood from consideration of the display point DP' in the row $r_5$ of FIG. 1 and noting that the distance along $r_5$ between the intersections of this row with $R_O$ and $R_I$ is termed XHAT and that the distance between DP' and $R_O$ and $r_5$ is termed COUNT. Division of COUNT by XHAT will yield $\theta$ERR which is equal to $\theta$ERR'/$\Delta\theta$.

DETERMINATION OF XHAT

It has been shown in the patent application of which this is a continuation-in-part that each time the scan of display points drops one row XHAT is increased by a quantity $\Delta$XHAT equal to $K_y|\tan\theta_O-\tan\theta_I|$ where $\theta_O$ is the angle between the center line of the sector and $R_O$ and $\theta_I$ is the angle between the center line and $R_I$. $K_y$ can be set equal to unity in this embodiment because $K_y=K_x=s$.

Reference is now made to FIG. 5 for a description of circuits for deriving the value of XHAT. Application of the L# signal from the output of the latch 116 of FIG. 4 to the address input of a ROM 276 in which the values of $\Delta$XHAT are stored for each $R_O$ selects the corresponding value of $\Delta$XHAT. The output of the ROM 276 lasts for an entire line and is applied to one input of an adder 278. The output of the adder 278 is applied to a latch 280 that is cleared by NACCCLR from the state address decoder 134 and is clocked by THETCLK from the address counter control 132, both of which are in FIG. 4. THETCLK occurs each time the display point scan drops one row of display points. The output of the latch 280 is connected back to another input of the adder 278 so as to form an accumulator that produces at the output of the latch 280 the value of XHAT, which is the sum of ΔXHAT for each step along a column of display points. A larger number of bits are used in the feedback to the adder 278 so as to prevent too great an accumulated error. Sixteen bits are used in this accumulator with the four MSB bits used for the integer part of XHAT.

DETERMINATION OF COUNT

In the system being described, the separation $K_x$ between columns of display points is equal to the separation $K_y$ between rows, and each is equal to the separation s between display samples so that all may be considered as unity. COUNT is the distance of a display point from $R_O$ as measured along its row. It is apparent that COUNT for a display point DPΔ is one greater than COUNT was for DP' because it is one column to the right of DP', and it can be shown for each drop of the display point scan from one row to the next that COUNT increases by tan $\theta_O$.

The signals representing the L# from the latch 116 of FIG. 4 and the signals, XDIR and YINC/$\overline{XINC}$, from the address counter control 132 of the same figure are applied to a ROM 282 of FIG. 5 so as to select one of the values +1, −1 and tan $\theta_O$ as indicated in FIG. 5A. The angle $\theta_O$ is the angle between the outer line $R_O$ and the center line of the sector and therefore the value of tan $\theta_O$ depends on the L# selected.

A latch 284 is connected between the output of the ROM 282 and the input of an adder 286, and its output is conducted to a latch 288. The latch 288 is cleared by NACCCLR from the state address decoder 134 of FIG. 4 and is clocked by a signal ACCCLK from the address counter control 132 of FIG. 4. The output of the latch 288 is connected to another input of the adder 286 so as to sum all the values selected from the ROM 282 for each step indicated by the display point scanning control signals YINC/$\overline{XINC}$ and XDIR. This sum is the value of COUNT as measured from $R_O$. Sixteen bits are used in the feedback loop as compared to eight for the sum so as to reduce accumulated error. Four bits are used for the integer portion of COUNT. Unlike RERR and XHAT, however, COUNT can have a negative value when the display point is outside $R_O$. Therefore, the MSB bit is provided at the output of the latch 288 to indicate whether the value of COUNT is plus or minus.

DETERMINATION OF $\theta$ERR $\theta$ERR is actually COUNT/XHAT as previously explained. This division could be done directly but this would involve a sixteen-by-sixteen bit division. Since this accuracy is not needed in this embodiment, five-bit accuracy being sufficient, an appropriately selected five-bit field from both COUNT and XHAT will provide the necessary bit resolution in the divider. Since XHAT generally is the larger of the two numbers and non-negative, it is simply left-shifted until the MSB is non-zero, simple mgnitude scaling. COUNT is then shifted the same amount. The purpose of ROMS 290, 292 and 294 is to provide the capability to shift from zero to three shifts. The five-bit outputs of the ROMs 292 and 294 are passed through a latch 296 to a divider ROM 298 that divides the scaled COUNT by the scaled XHAT and applies the result to a latch 300 that outputs the desired signal $\theta$ERR which is conducted to the interpolation pipeline of FIG. 6.

In order to derive the signal THETOK? that indicates whether the display point is angularly between $R_O$ and $R_I$, the bit representing the sign of COUNT is conducted through an inverter 302 and the latch 296 to an AND gate 304. If COUNT is high, this bit is high so as to indicate that the display point is not outside the outer line $R_O$; but if COUNT is low, the input to 304 is low. A comparison circuit 306 is connected to receive COUNT from the latch 288 and XHAT from the latch 280 and outputs a high bit if COUNT is less than XHAT, thereby indicating that the display point is not inside $R_I$, and a low bit if COUNT is greater than XHAT indicating that the display point is inside $R_I$. The bit at the output of the comparison circuit 306 passes through the latch 296 and is connected to another input of the AND gate 304. Its output is passed through the latch 300 to provide the signal THETOK? which passes through the delay stages 204 to a different input of the NAND gate 206 than the input to which ROK? was applied. Thus, if either ROK? or THETOK? is low, the signal NVALD at the output of the buffer 210 prevents the writing of the final interpolated data value for the display point into the display memory DM'.

DETERMINATION OF THE FINAL INTERPOLATED DATA VALUE FOR A DISPLAY POINT

Interpolation of the intermediate interpolated data values such as $I_{O23}$ and $I_{I23}$ of FIG. 1 so as to derive a final interpolated data value at the angular position of the display point such as DP can be accomplished as follows. The intermediate interpolated data value on $R_O$ which appears at the output of the latch 272 of FIG. 6 is applied to an input of a $(1-\theta\text{ERR})$ ROM 308, and the intermediate interpolated data value on $R_I$ which appears at the output of the latch 274 is applied to an input of a $(\theta\text{ERR})$ ROM 310. For timing purposes, the signal $\theta$ERR at the output of the latch 300 of FIG. 5 is successively passed through latches 312, 314 and 316 that are activated by NENBL to inputs of the ROMs 308 and 310. The ROM 308 is programmed to multiply the intermediate interpolated data value on $R_O$ that appears at the output of the latch 272 by $(1-\theta\text{ERR})$, and the ROM 310 is programmed to multiply the intermediate interpolated data value on $R_I$ that appears at the output of the latch 274 by $\theta$ERR. Latches 308' and 310' that are clocked by NENBL are respectively connected between the outputs of the ROMs 308 and 310 and different inputs of an adder 318. The final interpolated data value for the display point addressed appears at the output of the adder 318 and is passed through latches 320 and 322 that are activated by NENBL to a buffer 324 that is activated by ENABLE. The output of the buffer 324 is connected to the display memory DM' and is stored at its x,y address indicated by the values on the leads 170 and 172 of FIG. 4 unless NVALD from the buffer 210 of FIG. 5 indicates that the display point for which the final interpolated data value at the output of the buffer 324 has been determined is either beyond the radius limit or not between the radial lines $R_O$ and $R_I$.

A read control 326 scans the display memory DM' in any desired manner and passes the final interpolated data value stored therein to a display means 328.

ALTERNATIVE EMBODIMENT

Although the scan conversion system just described is to be preferred, the system shown in FIG. 7 illustrates a different way of carrying out the functions involved. A display point x,y address counter 330 provides a signal identifying the column and row in which a display point for which a final interpolated data value is sought is located. The signal is applied to a ROM 332 which is programmed with the values of $\theta$ERR, RERRI, RERRO, the number of one of the four data samples to be used in the interpolation and the line number on which the data sample appears for each display point. A scanner 334 provides data samples to a line memory 336 that retains all the data samples for a sector. If the final interpolated data value is sought for a display point such as DP of FIG. 7A, its row and column coordinates are supplied by the counter 330 to the ROM 332 so as to cause it, for example, to output a line number corresponding to $R_O$ and a data sample number 1 so as to identify the data sample $S_{O1}$. The line memory device 336 is programmed to output the data samples $S_{O1}$, $S_{O2}$, $S_{I1}$ and $S_{I2}$ on response to the information as to line number and sample nuber. It is apparent that any one of the four data samples could be used.

In this example, the data samples $S_{O1}$ and $S_{O2}$ are applied to an interpolation ROM 338 and data samples $S_{I1}$ and $S_{I2}$ are applied to an interpolation ROM 340. The signal RERRO representing the ratio of the distance between $S_{O1}$ and the intersection of the row r of display points including DP and $R_O$ to the radial distance s between display points is applied to the interpolation ROM 338, and the signal RERRI, representing the ratio of the distance between $S_{I1}$ and the intersection of row r and $R_I$ to the radial distance s, is applied to the interpolation ROM 340. The first intermediate interpolated data value $I_{O12}$ at the output of the ROM 338 and the second intermediate interpolated data value $I_{I12}$ at the output of the ROM 340 are applied along the $\theta$ERR to a ROM 342 that derives the final interpolated data value for the display point DP.

In the scan conversion system illustrated in FIGS. 2 through 6, the means for deriving a first intermediate interpolated data value includes the circuits of FIG. 3 providing the data samples on OL, the circuits of FIG. 5 providing the signal RERRO and the latch 250, ROM 252, ROM 254 and adder 268 of FIG. 6. The means for deriving a second intermediate interpolated data value includes the circuits of FIG. 3 providing data samples on IL, the circuits of FIG. 5 providing the signal RERRI, and the latch 258, ROM 260, ROM 262 and adder 270 of FIG. 6. The means for deriving a signal representing the angular position of an identified display point includes the circuits of FIG. 5 providing the signals XHAT and COUNT as well as the divider 298. Finally, the means for interpolating the first and second intermediate interpolated data values includes the ROMs 308 and 310 and the adder 318 of FIG. 6.

In the alternative scan conversion system illustrated in FIG. 7, the means for deriving the first intermediate interpolated data value includes the ROM 332, memory device 336 and the interpolation ROM 338; and the means for deriving the second intermediate interpolated data value includes the ROM 332, memory device 336 and the interpolation ROM 340. The ROM 332 provides the signal $\theta$ERR representing the angular position of the display point, and the interpolation ROM 342 is the means for providing the final interpolated data value for the display point.

What is claimed is:

1. Apparatus for deriving from data samples at the intersections of radial lines of a sector with arcs having a spacing s and the same origin as the radial lines a final interpolated data value to be used at display points within said sector, said display points being arranged in rows and columns, the said origin having a given location with respect to said rows and columns, there being a separation $K_x$ between the columns and a separation $K_y$ betwken the rows, an input to which data samples may be applied, memory means coupled to said input for storing at least three radial lines of the said data samples, selection means identifying a display point and deriving at least four data samples, at least two from one radial line and at least two from another radial line, the identified display point and the data samples being related in that the locations of said at least four data samples define an area containing the identified display point, the said apparatus comprising means for deriving a first intermediate interpolated data value from two of said data samples on one of said radial lines at the intersection of said radial line with a row of display points including the identified display point for which a final interpolated data value is sought, means for deriving a second intermediate interpolated data value from two of said data samples on said another radial line at the intersection of said another radial line and said row of display points including said identified display point for which a final interpolated data value is sought, means for deriving a signal representing the angular position of said identified display point with respect to said radial lines, and means for interpolating said first and second intermediate interpolated data values in response to said signal representing the angular position of said identified display point so as to derive a final interpolated data value at said angular position.

2. In apparatus wherein the image represented by data samples occurring at equally spaced points along radial lines emanating from the origin of a sector is reproduced by interpolated data values at display points arranged in orthogonal rows and columns, the rows being separated by a distance $K_y$, apparatus for deriving interpolated data values at the point of intersection of a given radial line with a row of display points, comprising a memory for storing at least some of said data samples occurring on said given radial line, means for providing a first signal indicating the radius of the intersection of said given radial line with a given row of display points, means for providing display point scanning signals indicating the steps from one display point to the next along a row or column of display points in scanning from a display point on said given row along a path passing through display points between said given radial line and another radial line, means responsive to said display point scanning signals for updating said first signal with the absolute value of $K_y/\cos\theta$ for each step in said display point scanning signal from one row of display points to the next, wherein $\theta$ is the acute angle between the said given radial line and a column of display points, selection means responsive to said display point scanning signals for selecting data samples from said memory, and means responsive to said updated first signal and the data samples on said given radial line selected by said selection means for deriving an interpolated data value at the radial distance represented by said updated first signal, which radial distance is the intersection of said given radial line and a row of display points.

3. Apparatus as set forth in claim 1, having means providing a second signal indicating the radius of the intersection of another of said radial lines with said given row of display points, means responsive to said display point scanning signals for updating said second signal with the absolute value of $K_y/\cos\theta'$ for each step in said display point scanning signal from one row of display points to the next, wherein $\theta'$ is the acute angle between said another radial line and a column of display points, a second memory for storing at least some of said data samples on said another radial line, second selection means responsive to said display point scanning signal for selecting data samples from said second memory, means responsive to said updated second signal and data samples selected by said second selection means for deriving a second interpolated data value at the radial distance represented by said updated second signal, means responsive to said scanning signals for deriving a third signal representing the angular position of each display point on said given row lying between said given and another radial lines with respect to said given and said another radial lines, and means responsive to said third signal and said interpolated data values for deriving a final interpolated data value for each display point on said given row that is between said radial lines.

* * * * *